N. D. CHASE.
TOOL FOR REMOVING AND REPLACING VEHICLE TIRES.
APPLICATION FILED FEB. 5, 1917.
1,246,050.
Patented Nov. 13, 1917.
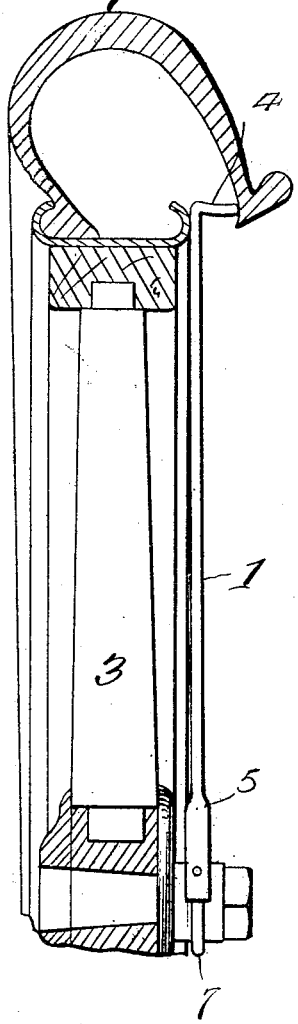
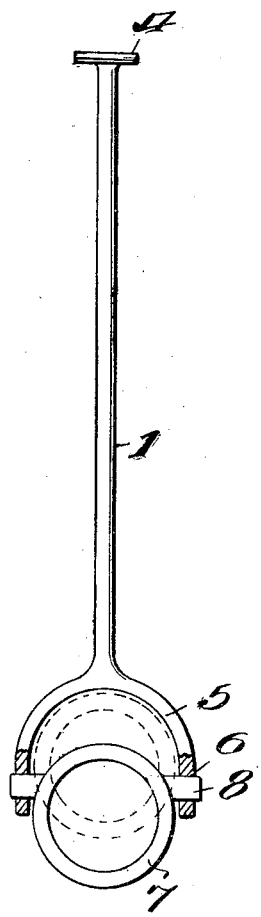
N. D. Chase
Inventor
By Geo. P. Kimmel
Attorney

UNITED STATES PATENT OFFICE.

NEWTON D. CHASE, OF HORNBROOK, CALIFORNIA, ASSIGNOR OF ONE-HALF TO FRANK FRAME AND ARTHUR THOMAS, BOTH OF HORNBROOK, CALIFORNIA.

TOOL FOR REMOVING AND REPLACING VEHICLE-TIRES.

1,246,050. Specification of Letters Patent. Patented Nov. 13, 1917.

Application filed February 5, 1917. Serial No. 146,756.

*To all whom it may concern:*

Be it known that I, NEWTON D. CHASE, a citizen of the United States, and resident of Hornbrook, in the county of Siskiyou and State of California, have invented certain new and useful Improvements in Tools for Removing and Replacing Vehicle-Tires, of which the following is a specification.

This invention relates to new and useful improvements in tire tools, and the primary object of the invention is to provide a tire tool of this character for removing or replacing tires on a vehicle wheel that greatly reduces the manual labor for this operation, and allows rapid manipulation without injury to the tire.

Another object of this invention is to provide a tire tool of this character which is longitudinally adjustable whereby the same may be applied to vehicle wheels of different sizes. In a tire tool of this character that is applied to the hub of the vehicle wheel and rotated to remove or replace the tire, where the front and rear wheels of the vehicle are of different sizes it is necessary to employ different sized tools, but by having the tool longitudinally adjustable so as to be applied to either the front or rear wheel the same tool may be employed for the single purpose.

Another object of the invention is to provide a device of this character which is easily and simply constructed, inexpensive to manufacture, and one which will be very efficient in operation.

With these and other numerous objects in view my invention consists of the novel features of construction, combination and arrangement of parts which will be herein referred to and more particularly pointed out in the specification and claims.

Referring to the drawings which form part of this specification:

Figure 1 is a transverse section through a portion of a vehicle wheel showing the tool in position for removing the tire therefrom;

Fig. 2 is an elevation of the tire tool.

In describing my invention I shall refer to the drawings in which similar reference characters designate corresponding parts throughout the several views. The tire tool comprises a body portion 1 which is preferably formed of a straight rod, with its upper end bent laterally as shown at 4 and flattened and curved arcuately.

The lower end of the body portion 1 is provided with a yoke 5 which has alining openings 6 adjacent the lower ends thereof. Adapted to be eccentrically mounted in the yoke 5 is a hub engaging ring 7 which is provided with projecting studs 8 on its outer edge which are adapted to be positioned in the openings in the yoke 5. These studs which are pivotally mounted in the yoke are so arranged that the ring 7 will be eccentrically mounted in the yoke whereupon it is adapted to the positions as shown in full lines and dotted lines in Fig. 2 of the drawings. This allows the tool to be longitudinally adjustable so that the same is adapted to fit different sizes of vehicle wheels.

The operation of this tool is obvious. When the ring 7 is positioned on the hub portion of the vehicle wheel, the body portion 1 of the tool will extend radially therefrom, and this tool is of such length that the laterally bent upper end of the body portion is adapted for engagement with the tire, as clearly shown in Fig. 1 of the drawings. It is of course understood that before the tool is operated the tire has been partially pried loose from the rim, so that the tool may be positioned under the edge of the casing as clearly shown in Fig. 1, whereupon when the body portion of the tool is rotated around the vehicle wheel the remaining edge of the casing will be withdrawn from the rim, and the tire is consequently easily removed from the wheel. The operation of replacing the tire is obvious.

Certain types of vehicles have different sized front and rear wheels, and to obviate the necessity of employing tire tools of different sizes, I have made the tire tool adjustable as is clearly shown in Fig. 2 of the drawings. When it is desired to use the tool on the largest wheel, the hub engaging ring is positioned as shown in full lines in Fig. 2, but when it is desired to use the tool on the shorter wheel, the hub engaging ring is swung within the yoked end of the tool to the position shown in dotted lines in that figure of the drawings whereupon it will be obvious that the tool will be longitudinally adjusted so that it is applicable on the shorter wheel.

From the foregoing description of the construction and operation of my new and improved tire tool the manner of applying the same to use will be readily understood and it will be seen that I have provided a simple and efficient means for carrying out the objects of this invention.

What I claim for my invention and desire to be secured by Letters Patent is:—

1. A tire tool of the class described including a straight rod, a laterally extending arcuately curved upper end on said rod adapted to engage a tire, a yoke on the lower end of said rod, a hub engaging ring eccentrically mounted in the yoke whereby the tool is longitudinally adjustable for application to different sized wheels.

2. A tire tool of the class described including a straight rod adapted to be positioned radially with respect to a vehicle adjacent one side of the same, tire engaging means on the outer end of the tool, and an eccentrically mounted ring on the inner end of said tool and adapted to loosely engage the hub of said wheel.

In testimony whereof, I affix my signature hereto.

NEWTON D. CHASE.

Copies of this patent may be obtained for five cents each, by addressing the "Commissioner of Patents, Washington, D. C."